(12) United States Patent
Richter et al.

(10) Patent No.: US 6,215,738 B1
(45) Date of Patent: Apr. 10, 2001

(54) DEVICE FOR READING FROM OR WRITING TO OPTICAL RECORDING MEDIA

(75) Inventors: Hartmut Richter, Villingen-Schwenningen; Dietmar Uhde, Königsfeld, both of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/165,718

(22) Filed: Oct. 2, 1998

(30) Foreign Application Priority Data

Oct. 4, 1997 (DE) .............................. 197 43 935

(51) Int. Cl.⁷ ...................................... G11B 7/00
(52) U.S. Cl. .................. 369/44.27; 369/44.29; 369/44.12; 369/119
(58) Field of Search ............. 369/44.28, 44.29, 369/44.35, 44.27, 119, 44.34, 44.11, 44.12

(56) References Cited

U.S. PATENT DOCUMENTS

| | | | |
|---|---|---|---|
| 4,768,180 | 8/1988 | Janssen et al. | 369/44 |
| 4,782,474 | * 11/1988 | Arai et al. | 369/119 |
| 4,864,552 | 9/1989 | Getreuer et al. | 369/46 |
| 5,090,001 | 2/1992 | Ito et al. | 369/44.28 |
| 5,136,559 | 8/1992 | Nakayama | 369/32 |
| 5,199,017 | 3/1993 | Kagami et al. | 369/44.28 |
| 5,253,245 | * 10/1993 | Rabedeau | 369/44.21 |
| 5,570,328 | 10/1996 | Buchler et al. | 369/13 |

FOREIGN PATENT DOCUMENTS

| | | |
|---|---|---|
| 3227654 | 2/1983 | (DE) . |
| 0712121 A3 | 5/1996 | (EP) . |
| 2 081 935 | 2/1992 | (GB) . |
| 62-277633 | 12/1987 | (JP) . |
| 63-100628 | 5/1988 | (JP) . |
| 07065383 | 3/1995 | (JP) . |
| 9-16986 | 1/1997 | (JP) . |
| 09180204 | 7/1997 | (JP) . |
| 10069653 | 3/1998 | (JP) . |
| WO97/24718 | 7/1997 | (WO) . |

OTHER PUBLICATIONS

*Patent Abstracts of Japan (CD–ROM), Unexamined Applications, vol. 97, No. 1, Victor Co. of Japan, Ltd., Osada Yutaka.

* cited by examiner

Primary Examiner—Thang V. Tran
(74) Attorney, Agent, or Firm—Joseph S. Tripoli; Paul P. Kiel

(57) ABSTRACT

A device for reading from and/or writing to optical recording media, including a beam generator, a focus device, which focuses the beam generated onto the optical recording medium at a focal point, a displacement device, which displaces the position of the focal point on the recording medium in accordance with a first direction of movement in dependence on an actuating signal, and a detector, which detects a beam reflected from the optical recording medium and outputs a regulating signal to a regulator. The regulator generates an actuating signal for the displacement device. The invention allows a higher data transfer rate to be achieved with an acceptable outlay. This is achieved by a beam influencing device arranged in the beam path and, in dependence on a further actuating signal of the regulator, influences the position of the focal point on the recording medium in accordance with the first direction of movement.

36 Claims, 2 Drawing Sheets

DEVICE FOR READING FROM OR WRITING TO OPTICAL RECORDING MEDIA

FIELD OF THE INVENTION

The present invention relates to a device for reading from and/or writing to optical recording media.

BACKGROUND OF THE INVENTION

A device of this type is disclosed in EP-B1-0 258 450. In this device, a beam is focused by a focusing means onto an optical recording medium at a focal point. The focal point is guided along data tracks of the recording medium by a displacement means which displaces the position of the focal point on the recording medium. The position of the focal point on the recording medium is displaced by the displacement means indirectly in this device, that is to say by way of the displacement of a lens of the focusing means, which results in displacement of the position of the focal point on the recording medium. The direction of movement is in this case perpendicular to the direction of the tracks present on the recording medium, the focal point being moved both in the positive direction and in the negative direction, depending on the requirement, while the tracks move away under the focal point in their longitudinal direction on account of the rotary movement of the recording medium. Due to inaccuracies, for example in the eccentricity of the recording medium designed as a disk, for example a CD, and tolerances in the securing of the recording medium in the device, it is necessary to displace the focal point virtually at all times in order to keep it on the track. In order to achieve a higher data transfer rate, it is expedient to increase the reading speed of the device. The consequence of this is that the displacements of the focal point on the recording medium which are necessary for the purpose of tracking have to be effected at an increased frequency. The known device may be regarded as having the disadvantage that it is unable, owing to the inertia of the focusing means, to achieve a desired high data transfer rate since tracking of the focal point on a track of the recording medium is no longer ensured correctly at a high reading speed.

SUMMARY OF THE INVENTION

The object of the present invention, therefore, is to improve the known device to the effect that a higher data transfer rate can be achieved with an acceptable outlay.

This object is achieved by means of the features specified in the characterizing part of claim 1, according to which a beam influencing means is arranged in the beam path and, in dependence on an actuating signal of the regulator, influences the position of the focal point on the recording medium, in accordance with the same direction of movement which is also achieved by the displacement means. This has the advantage that a second beam influencing means, which co-operates with the first and influences the focal point in a direction of movement, ensures an increased accuracy and an increased speed of the desired and/or necessary displacement of the position of the focal point on the recording medium. Consequently, a higher data transfer rate can be achieved according to the invention. A movable mirror, for example, is provided as the beam influencing means. The direction of movement in which the focal point is displaced on the recording medium preferably lies in the plane of the recording medium, preferably essentially perpendicularly to the tracks of the recording medium, in order to enable tracking. A direction of movement which is essentially perpendicular to the plane of the recording medium is also provided according to the invention in order to enable exact focusing of the beam on the recording medium. In this case, the present invention is not restricted to optical recording media in the form of circular disks; other types of recording media, for example those in tape form, also lie within the scope of the invention.

The invention provides for one of the actuators or beam influencing means to have a large adjusting distance with a small bandwidth, while the corresponding other has a small adjusting distance with a large bandwidth. This has the advantage that optimization of the respective actuator to one of the properties "large adjusting distance" or "large bandwidth" makes it possible to use actuators of simple construction. Simultaneous optimization of both properties, on the other hand, can generally be achieved only with a disproportionately high outlay. Bandwidth is in this case essentially understood to mean the width of the frequency band of the actuating signal for which the actuator is designed, that is to say, for example, for which it can follow the actuating signal virtually with no delay and with no resonance. In general, the bandwidth is limited by an upper frequency which is influenced inter alia by the inertia of the actuator. It is advantageous, therefore, to design the actuator having a relatively large inertia as that with the small bandwidth.

An advantageous configuration of the present invention is to arrange a high-pass filter between the detector and the actuator with a large bandwidth, or to arrange a low-pass filter between the detector and the actuator with a small bandwidth. It is advantageous to employ both measures simultaneously. These measures have the advantage that it is consequently possible to split the regulating signals between the two actuators in a simple manner. In this context, a first variant provides for the regulating signal output by the detection means to be the one to be forwarded to the regulator by means of a corresponding filter. The said regulator consists of two isolated, mutually independent, separate regulators for each actuator, or advantageously consists of a coupled regulator in which both regulating paths influence one another. Another variant provides for an output signal of the regulator to be split by means of high-pass and/or low-pass filters and fed to the respective actuator. The band ranges of high-pass and low-pass filters advantageously overlap at least partially.

According to the invention, the beam influencing means is a movable micromirror. This has the advantage that the beam influencing means is small, that is to say has a low mass, and is thus able to carry out rapid movements. A large bandwidth of the beam influencing means is thus ensured. It is likewise advantageous that moving the micromirror requires only a small driving power, which ensures an economical energy consumption, little evolution of heat and other advantages which can be obtained by a low power consumption. In this case, the mirror is designed as a tilting mirror in order to enable tracking, for example as an electrostatically driven silicon mirror. For the purpose of focus following, the mirror is designed as a parallel-displaceable mirror. The resulting path difference of the beam reflected at the mirror leads to a displacement of the focal point in the direction of the optical axis; focusing on the recording medium is possible in this way. The micromirror is driven electrostatically, by means of a piezoelectric element or by similar suitable drive means.

The invention provides for beam generating means, detection means and beam influencing means to be provided integrated on a single semiconductor substrate. This has the advantage that adjustment of the individual elements arranged on the semiconductor substrate is already effected during the production of the substrate; when the device is assembled, all that is then necessary is a single adjustment of the semiconductor substrate, comprising a plurality of elements, in the device. The compactness of such an integrated semiconductor substrate can also be regarded as advantageous. The substrate can advantageously be integrated in devices of existing designs, without necessitating a redesign; a qualitative increase in the value of existing devices is thus possible. The semiconductor substrate is advantageously a silicon-based substrate since such substrates can be produced cost-effectively. Other elements are advantageously integrated on the semiconductor substrate as well, such as, for example, further optical elements, parts of the regulator, for example high-pass and/or low-pass filters, signal pre-amplifiers and the like. Monolithic production of these elements arranged on the semiconductor substrate is thus advantageously possible.

According to the invention, the beam generating element and the detection means are arranged such that they are "optically conjugate" with respect to one another. This has the advantage that the image on the detection means does not drift undesirably due to the operation of the beam influencing means. The detection means generally has a plurality of detector elements whose summation, difference, phase comparison signal or the like is used to form regulating signals. A displacement of the light pencil falling onto the detection means which is not caused by the position of the focal point on the recording medium but rather is an interfering effect of the operation of the beam influencing means therefore has an interfering influence on the regulating quality. The term "optically conjugate" should in this case be understood to mean that the beam generating element and the spot of light on the detection means remain images which are conjugate with respect to one another, irrespective of the state of the beam influencing means and/or of the focusing means.

The direction of movement in which the focal point can be influenced is advantageously a direction of movement which is suitable for focusing. In other words, the focal point is moved from above or below the plane of the recording medium in which the information layer to be read from or written to lies, in such a way that the said focal point lies optimally on this plane. The direction of movement thus penetrates the plane of the recording medium. Fast and exact focusing is thus made possible. It is likewise advantageous that the direction of movement in which the focal point can be influenced is a direction of movement which is suitable for tracking, that is to say that it lies in the information-carrying plane of the recording medium. Fast and exact tracking is thus made possible.

The independent method claim specifies a method, according to the invention, for the tracking and/or focusing of a beam on an optical recording medium in a corresponding device. This method has the advantage that by splitting the actuating signal into a high-frequency part and a low-frequency part, it becomes possible to use, instead of an actuator which is not optimized for either of the two frequency ranges and whose bandwidth must be limited in a compromise with its adjusting distance, a respective actuator which is optimized to the corresponding bandwidth or the corresponding actuating distance. Such actuators are, for their part, relatively inexpensive.

According to the invention, a high-pass filtered component of the regulating signal is again split into a higher-frequency component and a low-frequency component, the latter being used to operate a fine drive similar to one used in known devices. The higher-frequency part, on the other hand, is used to operate an additional, super-fine drive. The latter preferably has a tiltable mirror, but it is likewise advantageously possible to provide other elements here, for example an electro-optical scanner. The low-pass filtered component of the regulating signal is used to operate a coarse drive, in a similar manner to that known from conventional devices.

In an advantageous manner, the regulating signal itself is actually split into high-frequency and low-frequency components, which are used to determine actuating signals for corresponding actuators. This has the advantage that it is possible to use two separate regulators which are optimally matched to the corresponding regulated system.

Further advantages of the invention emerge from the following description of exemplary embodiments with reference to the figures. In this case, the exemplary embodiments specify advantageous configurations of the invention; however, the invention is not restricted to these exemplary embodiments but rather includes modifications which are familiar to a person skilled in the art.

DETAILED DESCRIPTION OF PREFERED EMBODIMENTS

Figure 1:
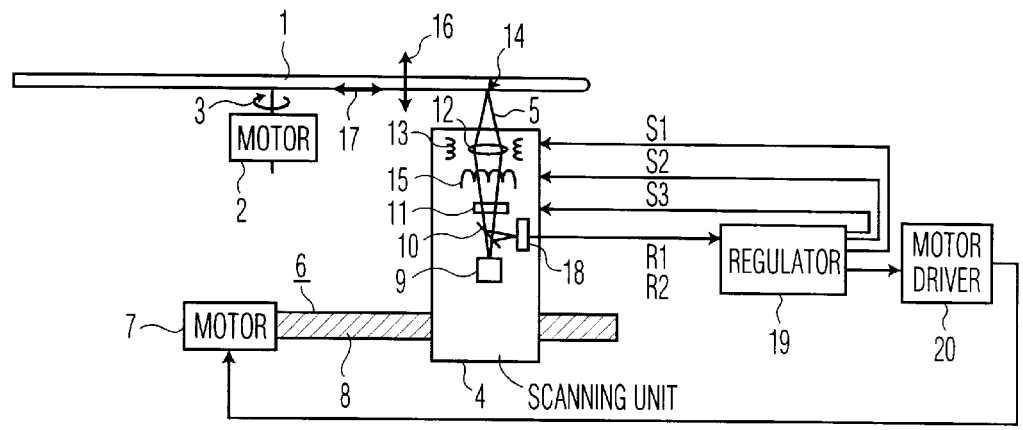
FIG. 1 shows a diagrammatic illustration of a device according to the invention.

FIG. 1 shows a diagrammatic illustration of a device according to the invention. A recording medium 1 is made to rotate in accordance with arrow 3 by a motor 2 of the device. A scanning unit 4 scans the recording medium 1 by means of a beam 5, preferably a laser beam. Information is or can be stored on the recording medium 1 in concentrically or spirally arranged tracks. As a result of the rotation of the recording medium 1 in the direction of the arrow 3, the scanning beam 5 can follow a track in the tangential direction, that is to say in the longitudinal direction. A movement of the beam 5 in the radial direction with regard to the recording medium 1 is possible on the one hand by means of a track actuator 15, as described in more detail below, and by means of a coarse drive 6. The latter is illustrated as a spindle 8 driven by a motor 7 in the exemplary embodiment, which spindle interacts with the scanning unit 4 and displaces the latter in the radial direction with regard to the recording medium 1.

The scanning unit 4 has a beam generating means 9, which generates the beam 5. In the described embodiment the beam generating means 9 is a semiconductor laser. The beam 5 passes through a beam splitter 10 and a beam influencing means 11 to a focusing means 12, which is designed as a converging lens. The focusing means 12 can be displaced in the direction of propagation of the beam 5 by means of a focus actuator 13 indicated by two coils. In this way, the beam 5 can be focused exactly on the information-carrying surface of the recording medium 1. Its focal point 14 is likewise displaced in the direction of the beam, that is to say perpendicularly to the information-carrying surface of the recording medium 1, on account of the displacement of the focusing means 12 in the direction of the beam, which displacement is brought about by the focus actuator 13. In this way, it is possible to keep the focal point 14 focused on the track at all times, even in the event of an uneven surface of the recording medium 1 or in the event of the recording medium 1 not being secured exactly flat in the device.

A track actuator 15, which is likewise indicated as a coil, displaces the beam influencing means 11 in the radial direction with regard to the recording medium 1, thereby ensuring exact guidance of the focal point 14 on the track in the radial direction. This is necessary since, for example due to eccentricity of the tracks located on the recording medium 1 and/or due to inexact positioning of the recording medium 1 in the device, even with concentric tracks a fluctuation occurring with the period of the revolution occurs in the radial direction. The direction 16 of movement of the focal point 14 is brought about by the focus actuator 13 and is indicated by an arrow, and the direction 17 of movement of the focal point 14 is brought about by the track actuator 15 and is indicated by a further arrow; the said direction 16 of movement runs virtually perpendicularly to the surface of the recording medium 1, while the said direction 17 of movement lies in the information-carrying plane of the recording medium 1.

The beam 5 is reflected from the recording medium 1, passes through the focusing means 12 and the beam influencing means 11 and is deflected at least partially by the beam splitter 10 onto a detection means 18. The detection means 18 has a plurality of detector elements (not individually illustrated here). They are generally photodetectors which convert the light impinging on them into electrical signals. The signals output by the detector elements are optionally combined and forwarded to a regulator 19 as regulating signal R1, R2. In the exemplary embodiment, at least one focus regulating signal R1 and one track regulating signal R2 are applied to the regulator 19. The regulator 19, which is not described in any specific detail here, outputs an actuating signal S1 to the focus actuator 13, a first track actuating signal S2 to the track actuator 15 and a second track actuating signal S3 to the beam influencing means 11. An output of the regulator 19 is connected to a motor driver 20, which drives the motor 7 of the coarse drive 6.

Figure 2:
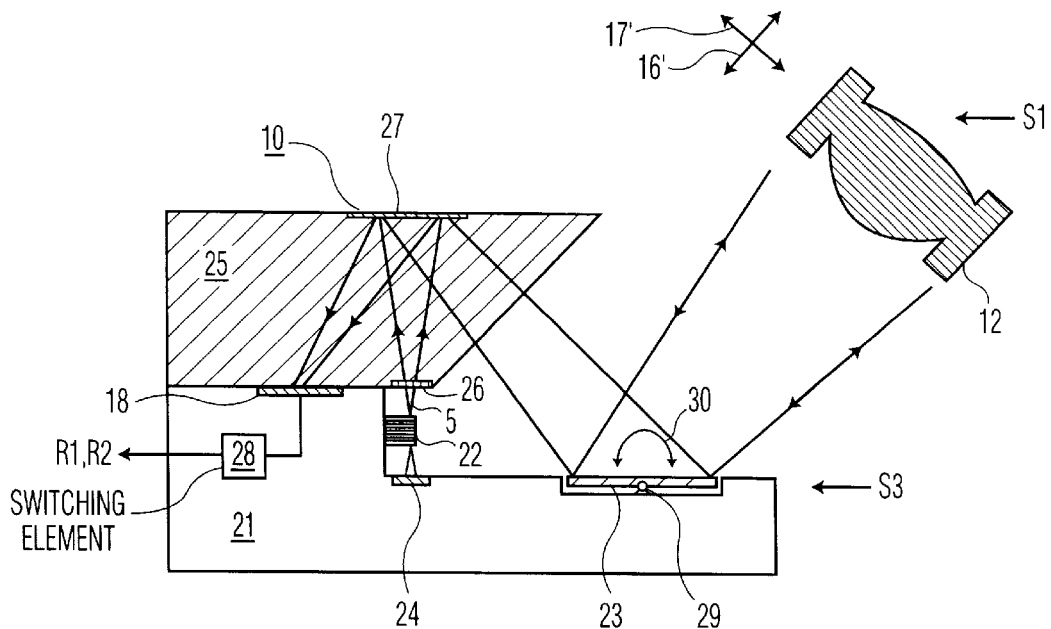
FIG. 2 shows part of an optical unit of a first exemplary embodiment of the invention.

Part of an optical unit of a first exemplary embodiment of the invention is represented in FIG. 2. A laser diode 22 as beam generating means 9, a detection means 18 and an electrostatically drivable micromirror 23 are arranged on a semiconductor substrate 21. A lens which serves as focusing means 12 and is at a much greater distance from the semiconductor substrate 21 is represented in an illustration that is not to scale. It can be moved by displacement means 13, 15 (not illustrated) in the direction of the directions 16', 17' of movement which are indicated by arrows and correspond to the previously described directions 16, 17 of movement of the focal point 14 on the recording medium 1. Furthermore, a monitor diode 24 is arranged on the semiconductor substrate 21, which diode receives light generated by the laser diode 22 and converts it into an electrical signal. This signal serves for regulating the power of the laser diode 22, this being done in a known manner and therefore not being described in any specific detail here. The power regulation serves to keep the optical power output by the laser diode 22 essentially constant.

Furthermore, a glass prism 25 is arranged on the semiconductor substrate 21, which prism is provided with a phase grating 26 and a hologram 27 serving as beam splitter 10. The beam 5 generated by the laser diode 22 passes through the phase grating 26, not only the primary beam as zeroth-order diffraction beam but also ± 1st-order diffraction beams being produced and used in a known manner for tracking in accordance with the known three-beam method, which will not be described in any specific detail here. The resulting light pencil passes through the glass prism 25 and is deflected by the hologram 27 in the direction of the micromirror 23. It is reflected from the micromirror 23 in the direction of the focusing means 12. The light pencil reflected from the recording medium 1 passes through the focusing means 12 in the opposite direction, is reflected on the micromirror 23 in the direction of the glass prism 25 and falls onto the hologram 27, which directs it onto the detection means 18. As described above, the detection means 18 has a plurality of detector elements from whose output signals the regulating signals R1, R2 are obtained. At least some switching elements 28 necessary for this purpose are already arranged in the semiconductor substrate 21. The regulating signals R1, R2 are converted into actuating signals by the regulator 19 (not illustrated here).

An actuating signal S1 effects, via a track actuator 15 (not illustrated here), a displacement of the focusing means 12 in the direction 17' of movement in order thus to achieve tracking of the focal point 14. A further actuating signal S3 effects tilting of the micromirror 23 about the tilt spindle 29 thereof by means of electrostatically acting actuating elements (not illustrated here). The tilting direction is indicated by the double arrow 30 in this case. Tilting of the micromirror 23 about the tilt spindle 29 likewise brings about a displacement of the focal point 14 in the direction 17 of movement on the recording medium 1. Since the micromirror 23 has a substantially smaller mass than the lens of the focusing means 12 and the electrostatic actuating elements can react substantially more quickly than the track actuator 15 of conventional electromechanical design, the micromirror 23 enables beam influencing which reacts virtually with no delay, even to a high-frequency actuating signal S3, but which allows only a small adjusting distance in the direction 17 of movement due to the limited tiltability of the micromirror 23. By contrast, the focusing means 12 reacts to actuating signals S1 of lower frequency than is the case for the micromirror 23. The displacement distance which can be achieved by the focusing means 12 in the direction 17 of movement of the focal point 14 is substantially greater than is possible by means of the micromirror 23.

The chosen arrangement of the micromirror 23 between the glass prism 25 and the focusing means 12 ensures that the laser diode 22 and the detection means 18 are always in an optically conjugate position with respect to one another, irrespective of the tilting of the micromirror 23. In other words the light pencil falling onto the detection means 18 is displaced in terms of its position not as a result of the micromirror 23 tilting but only as a result of the tracking state and/or the focusing state of the focal point 14 changing. Additional compensation that would occur in the event of a corresponding displacement that is avoided here is not necessary. A displacement that is possibly caused by the operation of the focusing means 12 in the direction 17' of movement can also occur in conventional devices of the generic type and is corrected in accordance with the correction mechanisms that can be used therein, without necessitating an increased outlay in the device according to the invention.

Figure 3:
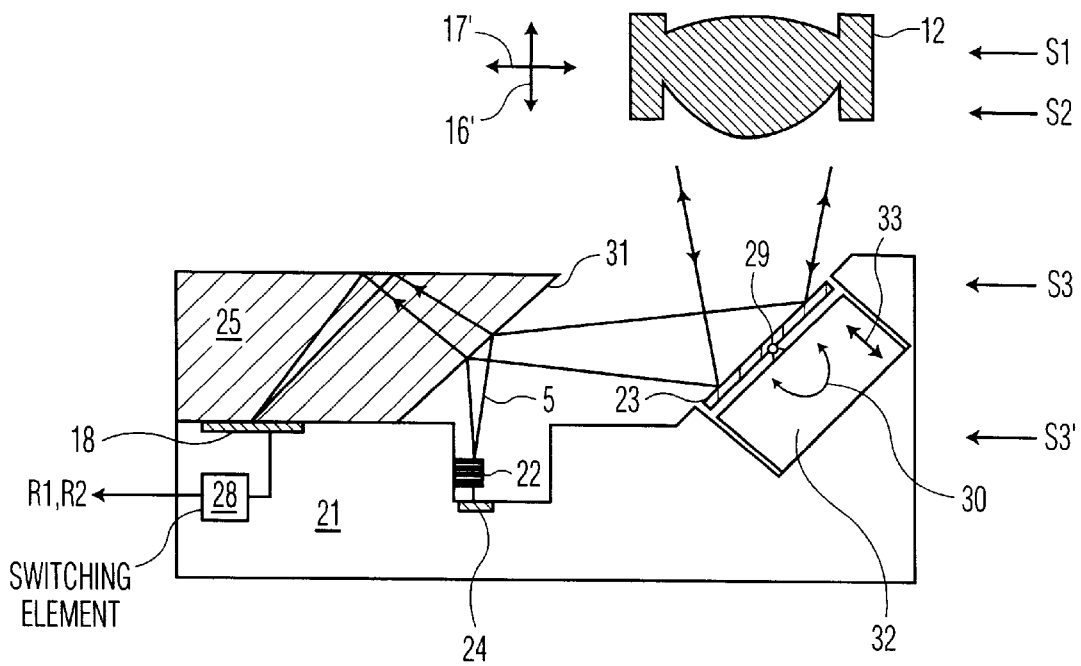
FIG. 3 shows part of an optical unit of a second exemplary embodiment of the invention.

FIG. 3 illustrates part of an optical unit of a second exemplary embodiment of the invention which, in a similar manner to that described with reference to FIG. 2, has a laser diode 22, a detection means 18 and a micromirror 23 arranged on a semiconductor substrate 21. Here, too, the focusing means 12 is shown in a size that is not to scale and at a distance from the semiconductor substrate 21 that is not to scale; its directions 16', 17' of movement are indicated by double arrows. In this exemplary embodiment, too, a monitor diode 24 is arranged on the semiconductor substrate 21 and performs the same function as described with reference to FIG. 2.

The beam 5 generated by the laser diode 22 is reflected from an outer surface 31 of the glass prism 25 in the direction of the micromirror 23. The latter can be tilted about the tilt spindle 29 in accordance with the direction of movement indicated by the double arrow 30, and deflects the light pencil coming from the glass prism 25 in the direction of the focusing means 12, and also deflects the light pencil arriving from the focusing means 12 in the direction of the glass prism 25. The light pencil coming from the micromirror 23 enters the glass prism 25, which deflects it onto the detection means 18. Regulating signals R1, R2 are generated in a corresponding manner to that described with reference to FIG. 2 and are converted by a regulator 19 into an actuating signal S1 for the focusing means 12 and into an actuating signal S3 for the tilting of the micromirror 23. An actuating signal S2 is used to displace the focusing means 12 in the direction 16' of movement in order to displace the focal point 14 perpendicularly to the plane of the recording medium 1, that is to say for the purpose of focusing. This is effected only up to an upper limit frequency on account of the inertia of the focusing means 12 and of the focus actuator 13. A higher-frequency actuating signal S3' is fed to a piezoelectric element 32. This piezoelectric element 32 is likewise arranged on the semiconductor substrate 21 and enables parallel displacement of the micromirror 23 perpendicularly to its reflecting surface in the direction of movement indicated by the double arrow 33. This brings about an additional displacement of the focal point 14 in the direction 16 of movement relative to the surface of the recording medium 1 which is effected at a higher frequency than the upper limit frequency applicable to the focusing means 12 but has a smaller displacement distance than that which is made possible by the focusing means 12.

In the case of the beam influencing means for focusing indicated in FIG. 3, the piezoelectric element 32, it ought to be noted that with the actuation thereof, the reflected beam is also displaced slightly in the direction 17' of movement; this can be compensated for, if appropriate, by corresponding tilting of the micromirror 23. This is because the micromirror 23 is arranged such that it is tilted with respect to the direction of propagation of the beam 5. In the event of perpendicular incidence of the beam on the micromirror 23, compensation effected by adjustment in the direction indicated by the double arrow 33 is unnecessary.

Figure 4:
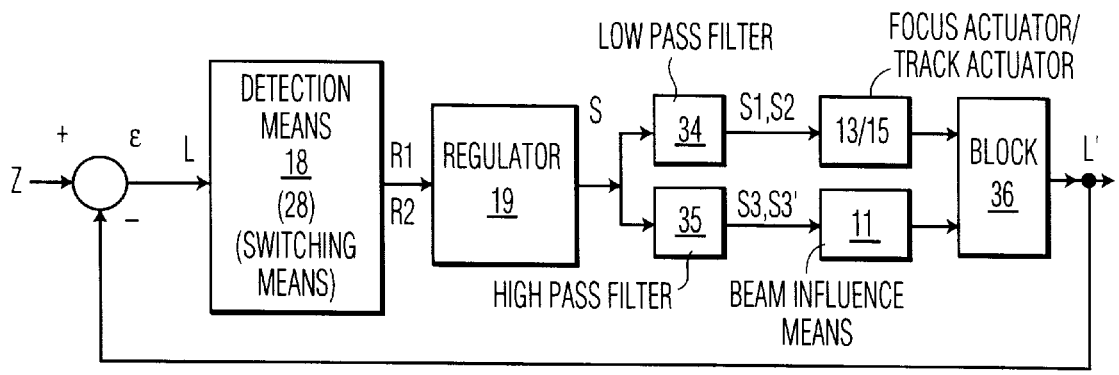
FIG. 4 shows a block diagram of a servosystem in accordance with a first method according to the invention.

FIG. 4 illustrates a block diagram of a servosystem in accordance with a first method according to the invention. Tracking control and focusing control are described using this single figure. However, it is to be understood that the signals described relate to only one of those, eihter to tracking control or focusing control, respectively, at one time. The detection means 18 converts the incident light signal L, if appropriate by means of switching elements 28, into a regulating signal R1, R2 which is fed to the regulator 19. The adjustment value S generated by the regulator 19 is split into an actuating signal S1, S2 for the focus actuator 13 and the track actuator 15, respectively, by means of a low-pass filter 34 and into an actuating signal S3, S3' for the beam influencing means 11 by means of a high-pass filter 35. Not only focus actuator 13 and track actuator 15 but also the beam influencing means 11 act on the beam 5. The latter interacts with the recording medium 1. This is shown as block 36 in the block diagram. The light signal L' that ideally arises in the process has interfering influences, indicated as interference variable Z in this case, superposed on it and acts as light signal L on the detection means 18.

Figure 5:
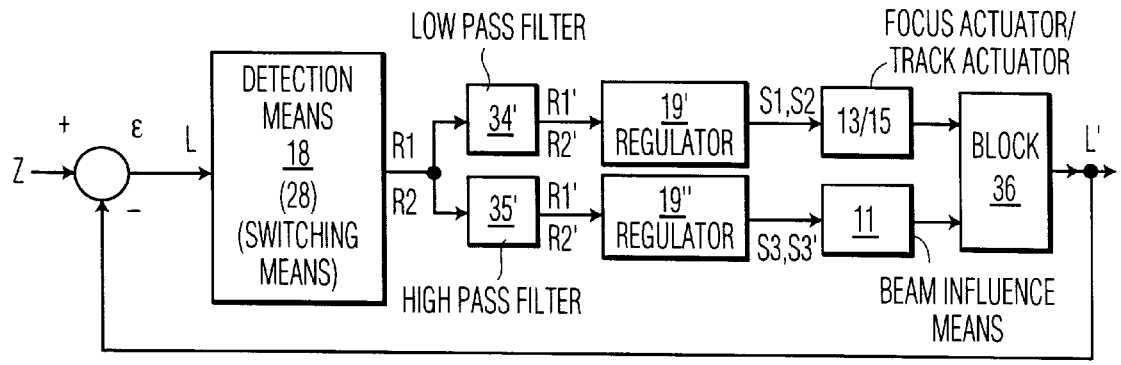
FIG. 5 shows a block diagram of a servosystem in accordance with a second method according to the invention.

FIG. 5 shows a block diagram of a servosystem in accordance with a second method according to the invention. In this case, the regulating signal R1, R2 which is generated by the detection means 18, if appropriate with the aid of switching elements 28, is split into a low-frequency component R1', R2' by means of a low-pass filter 34' and into a high-frequency component R1", R2" by means of a high-pass filter 35'. The high-frequency component R1", R2" is fed to a regulator 19", which outputs an actuating signal S3, S3' having a high bandwidth to the beam influencing means 11. The low-frequency component R1', R2' is fed to a regulator 19', which outputs an actuating signal S1, S2 having a low bandwidth to the focus actuator 13 and to the track actuator 15, respectively. Focus actuator 13 and track actuator 15 and beam influencing means 11 act, as described with reference to FIG. 4, on the block 36; the light signal L' possibly has an interference variable Z superposed on it and acts as light signal L on the detection means 18.

According to the invention, in order to increase the data transfer rate of optical disk or magnetic disk systems, the rotational speed of the recording medium 1, that is to say of the disk, is increased. The use of other, technically highly complex methods such as, for example, the use of a plurality of read/write heads, is therefore unnecessary. Since optical recording media 1 such as, for example, CD, DVD or the like quite generally have, on account of limited production accuracies, a specified maximum eccentricity and a so-called roughness or undulation of the information track and also a vertical runout, the scanning, diffraction-limited focal point 14, which is also referred to as the spot, is tracked with the aid of a dynamic actuator 11, 13, 15, in accordance with this two-dimensional movement of the data track, laterally and longitudinally with respect to the optical system of the scanner.

This is typically realized with the aid of an electromechanical two-axis actuator 13, 15, which tracks an objective lens 12 in accordance with the data track. However, this type of actuator is not inertialess on account of its complex structure and its function. The mechanical and/or the current/adjusting distance transfer function of the actuator therefore depends on the mass, the driving force and the damping. The specific actuator properties mentioned essentially determine the bandwidth of the overall servosystem and, consequently, in conjunction with predetermined values for the disk eccentricity or the vertical runout, limit the maximum rotational speed of the disk at which tracking or focus readjustment is still possible, and thus the data transfer rate. The maximum permissible eccentricity of typical optical recording media 1 is specified in the range of up to ±70 $\mu$m. Eccentricity can additionally occur due to the drive of the device and be added to the eccentricity of the disk. The rotational speed of CD drives with a 20-fold data rate is about 1000 revolutions per minute given an inner disk radius of 25 mm, about 170 Hz. For reliable scanning of the above-specified disk with a drive having an additional tolerance of about ±50 $\mu$m, the actuator, for tracking at 170 Hz, must provide at least an adjusting distance of ±120 $\mu$m, by calculation with unfavourable addition of the tolerance ranges. Since even higher-frequency components may be added on account of the abovementioned undulation of the data track and, in particular, large reserves have to be present for the coupling-in operations, such as e.g. after track jumps, in general significantly more stringent requirements have to be made of the actuator. Similar considerations apply to the focus actuator.

According to the invention, therefore, a two-stage actuator system is used for increasing the data transfer rate, which actuator system comprises an actuator 13, 15 having a large adjusting distance/small bandwidth and an actuator 11 having a small adjusting distance/large bandwidth. The error signal R1, R2 detected by the read/write head is high- and low-pass filtered in accordance with the bandwidths of the sub-actuators 11, 13, 15 and converted into actuating signals S1, S2 by suitable electronics 19, 19', 19" and fed to the sub-actuators 11, 13, 15.

The micromirror 23 provided as beam influencing means 11 allows only small angles of inclination. This quite generally suffices, however, since the objective lenses 12 which are typically used for the data readout and data recording and have a numerical aperture between NA=0.45 for CD and NA=0.6 for DVD have a limited field angle and therefore enable diffraction-limited imaging only in the range of less than about ±50–100 $\mu$m.

The two exemplary embodiments described afford the advantage of monolithic production of micromirror 23, detection means 18 and signal pre-amplifiers on the silicon substrate 21. Furthermore, integration both of edge-emitting and of surface-emitting laser diodes, which are also referred to as VCSEL, is also possible without a large outlay. The compact design means that a small deflection mirror 23 having a correspondingly low mass is used which thus enables fast beam deflection. The compact design additionally makes it possible to incorporate the semiconductor substrate 21 directly into a slow actuator of a device of an existing design.

For the servo signal generation, it is possible to use conventional methods such as e.g. the "Differential Spot Size" or the "Foucault" method for focusing and, in addition to the "three-beam" method already mentioned above, also the "Push-Pull" or the "Differential-Phase" method for tracking.

What is claimed is:

1. Device for reading from or writing to optical recording media, comprising:
   a beam generating means for generating a beam;
   a focusing means, which focuses the beam generated by the beam generating means onto an optical recording medium at a focal point;
   a displacement means, which displaces the focal point on the recording medium in a focusing direction of movement in dependence on a focusing actuating signal;
   a detection means, which detects a beam reflected from the optical recording medium and outputs a regulating signal;
   a regulator, which receives said regulating signal and generates the focusing actuating signal for the displacement means; and
   a beam influencing means arranged in the beam path and, in dependence on a further actuating signal generated by the regulator, influences the focal point on the recording medium in the focusing direction of movement.

2. Device according to claim 1, wherein the beam influencing means is a movable micromirror.

3. Device according to claim 2, wherein the beam generating means, the detection means and the beam influencing means are integrated on a single semiconductor substrate.

4. Device according to claim 1, wherein the beam generating means, the detection means and the beam influencing means are integrated on a single semiconductor substrate.

5. Device according to claim 1, wherein the beam generating means and the detection means are optically conjugate irrespective of the operating state of the beam influencing means.

6. Device according to claim 5, wherein the direction of movement penetrates a plane of the recording medium or lies in the plane of the recording medium.

7. Device according to claim 1, wherein the direction of movement of said focal point relative to said recording medium is one of substantially parallel to said recording medium, at an angle to said recording medium, and both substantially parallel to and at an angle to said recording medium.

8. Device according to claim 1, wherein the displacement means and the beam influencing means are actuators, one of which has a large adjusting distance with a small bandwidth and the other has a small adjusting distance with a large bandwidth.

9. Device according to claim 8, wherein the beam influencing means is a movable micromirror.

10. Device according to claim 9, wherein the beam generating means, the detection means and the beam influencing means are integrated on a single semiconductor substrate.

11. Device according to claim 8, wherein the beam generating means, the detection means and the beam influencing means are integrated on a single semiconductor substrate.

12. Device according to claim 8, wherein the beam generating means and the detection means are optically conjugate irrespective of the operating state of the beam influencing means.

13. Device according to claim 12, wherein the direction of movement of said focal point relative to said recording medium is one of substantially parallel to said recording medium, at an angle to said recording medium, and both substantially parallel to and at an angle to said recording medium.

14. Device according to claim 8, wherein the direction of movement of said focal point relative to said recording medium is one of substantially parallel to said recording medium, at an angle to said recording medium, and both substantially parallel to and at an angle to said recording medium.

15. Device according to claim 8, wherein a high-pass filter is arranged between the detection means and the actuator with a large bandwidth.

16. Device according to claim 15, wherein the beam influencing means is a movable micromirror.

17. Device according to claim 16, wherein the beam generating means, the detection means and the beam influencing means are integrated on a single semiconductor substrate.

18. Device according to claim 15, wherein the beam generating means, the detection means and the beam influencing means are integrated on a single semiconductor substrate.

19. Device according to claim 15, wherein the beam generating means and the detection means are optically conjugate irrespective of the operating state of the beam influencing means.

20. Device according to claim 19, wherein the direction of movement of said focal point relative to said recording medium is one of substantially parallel to said recording medium, at an angle to said recording medium, and both substantially parallel to and at an angle to said recording medium.

21. Device according to claim 15, wherein the direction of movement of said focal point relative to said recording medium is one of substantially parallel to said recording medium, at an angle to said recording medium, and both substantially parallel to and at an angle to said recording medium.

22. Device according to claim 8, wherein a low-pass filter is arranged between the detection means and the actuator with a small bandwidth.

23. Method for focusing a beam on a recording medium in a device for reading from or writing to optical recording media, comprising the following steps:
   a) generating a focus regulating signal from the beam reflected from the recording medium,
   b) forming an adjustment value from the regulating signal,
   c) forming a first focusing actuating signal from a low-frequency component of the adjustment value and a second focusing actuating signal from a high-frequency component of the adjustment value,
   d) parallel driving of a first focusing actuator having a low bandwidth for influencing a focal point on the recording medium using the first focusing actuating signal, and of a second focusing actuator having a high bandwidth for influencing the focal point on the recording medium using the second focusing actuating signal, and
   e) branching to step a).

24. Method according to claim 23, wherein method steps b) and c) are replaced by the following steps:
   f) splitting the regulating signal into a low-frequency component and into a high-frequency component,
   g) forming a first focusing actuating signal from the low-frequency component and a second focusing actuating signal from the high-frequency component.

25. Device for reading from or writing to optical recording media, comprising:
   a beam generating means for generating a beam;
   a focusing means, which focuses the beam generated by the beam generating means onto an optical recording medium at a focal point;
   a coarse displacement means for displacing the focal point over a large distance parallel to the surface of the recording medium;
   a fine displacement means, which displaces the focal point on the recording medium over a small distance in a tracking direction of movement in dependence on a tracking actuating signal;
   a detection means, which detects a beam reflected from the optical recording medium and outputs a regulating signal;
   a regulator, which receives said regulating signal and generates the tracking actuating signal for the fine displacement means, and
   a beam influencing means arranged in the beam path and, in dependence on a further actuating signal generated by the regulator, influences the focal point over a distance smaller than the small distance on the recording medium in the tracking direction of movement.

26. Device according to claim 25, wherein the beam influencing means is a movable micromirror.

27. Device according to claim 26, wherein the beam generating means, the detection means and the beam influencing means are integrated on a single semiconductor substrate.

28. Device according to claim 25, wherein the fine displacement means and the beam influencing means are actuators, the fine displacement means adjusting the focal point over a larger distance than the beam influencing means, and having a smaller bandwidth than the beam influencing means.

29. Device according to claim 28, wherein the beam influencing means is a movable micromirror.

30. Device according to claim 29, wherein the beam generating means, the detection means and the beam influencing means are integrated on a single semiconductor substrate.

31. Device according to claim 28, wherein a low-pass filter is arranged between the detection means and the actuator with a small bandwidth.

32. Device according to claim 28, wherein a high-pass filter is arranged between the detection means and the actuator with a large bandwidth.

33. Device according to claim 32, wherein the beam influencing means is a movable micromirror.

34. Device according to claim 33, wherein the beam generating means, the detection means and the beam influencing means are integrated on a single semiconductor substrate.

35. Method for the tracking of a beam on a recording medium in a device for reading from or writing to optical recording media, comprising the following steps:
   a) generating a track regulating signal from the beam reflected from the recording medium,
   b) forming a coarse tracking adjustment value from the tracking regulating signal,
   c) forming a fine tracking adjustment value from the regulating signal,
   d) forming a first tracking actuating signal from a low-frequency component of the adjustment value and a second tracking actuating signal from a high-frequency component of the adjustment value,
   e) parallel driving of a first tracking actuator having a low bandwidth for displacing a focal point on the recording medium using the first tracking actuating signal, and of a second tracking actuator having a high bandwidth for displacing the focal point on the recording medium using the second tracking actuating signal, and
   f) branching to step a).

36. Method according to claim 35, wherein method steps c) and d) are replaced by the following steps:
   g) splitting of the track regulating signal into a low-frequency component and into a high-frequency component,
   h) forming a first tracking actuating signal from the low-frequency component and of a second tracking actuating signal from the high-frequency component.

* * * * *